(12) United States Patent
Escalante, III

(10) Patent No.: US 7,174,751 B2
(45) Date of Patent: Feb. 13, 2007

(54) METHOD OF USING A KINGPIN LOCK HOLDER

(76) Inventor: Juan Nepomuseno Escalante, III, 6929 Curran St., San Diego, CA (US) 92154-5711

( * ) Notice: Subject to any disclaimer, the term of this patent is extended or adjusted under 35 U.S.C. 154(b) by 0 days.

(21) Appl. No.: 11/287,083

(22) Filed: Nov. 25, 2005

(65) Prior Publication Data
US 2006/0075792 A1    Apr. 13, 2006

Related U.S. Application Data

(62) Division of application No. 10/845,329, filed on May 14, 2004, now abandoned.

(51) Int. Cl.
*B60R 25/00*   (2006.01)
*F16B 41/00*   (2006.01)

(52) U.S. Cl. ............. 70/14; 70/62; 70/232; 70/258; 248/553; 280/507

(58) Field of Classification Search .......... 70/14, 70/57, 62, 229–232, 235, 237, 258; 248/551–553; 280/507
See application file for complete search history.

(56) References Cited

U.S. PATENT DOCUMENTS

| | | | | |
|---|---|---|---|---|
| 3,415,085 A | * | 12/1968 | Eble, Jr. | 70/232 |
| 3,574,363 A | * | 4/1971 | Stephenson | 403/127 |
| 3,744,284 A | * | 7/1973 | Waldenstrom | 70/232 |
| 4,282,995 A | * | 8/1981 | Austin | 224/42.23 |
| 4,704,883 A | * | 11/1987 | Dykes | 70/232 |
| 5,197,311 A | * | 3/1993 | Clark | 70/232 |
| 6,446,649 B1 | * | 9/2002 | Bigford | 135/16 |

* cited by examiner

*Primary Examiner*—Lloyd A. Gall
(74) *Attorney, Agent, or Firm*—George T. Parsons

(57) ABSTRACT

The present invention is a method of using a durable, cylinder-like device that is inserted within the main cylinder part of a kingpin lock. One preferred embodiment, of several, has an outside diameter in close tolerance to the inside diameter of a kingpin lock device. In addition, the holder is easily insertable into the kingpin lock device. A round hole is located within the wall of the holder such that the hole in a cylinder wall of each kingpin lock device aligns with the hole in the holder. The diameter of the hole in the holder is sufficient to allow a metal tongue to be inserted from the kingpin lock device through the hole in the holder. Then a key in the lockpin device is removed leaving the lock device secured to the holder. In addition, the holder has a metal plate perpendicularly welded to the cylinder part. The surface could be the underside of a trailer or box or in a storage compartment behind the cab of a tractor.

2 Claims, 1 Drawing Sheet

METHOD OF USING A KINGPIN LOCK HOLDER

This application is a divisional application of KINGPIN LOCK HOLDER, application Ser. No. 10/845,329, dated May 14, 2004, abandoned by the same inventor and Applicant Juan Nepomuseno Escalante, claiming the benefit of said prior parent application under 35 U.S.C. 121 and filed under 37 CFR 1.53 (b).

BACKGROUND OF THE INVENTION

1. Field of the Invention

The present invention relates generally to holding devices, and, more specifically, to a method of using a holder for a kingpin lock device. A kingpin is used in the trucking industry to join a tractor to a flatbed trailer or a box.

2. Description of the Related Art

The trucking industry moves the vast majority of all goods within the United States. The volume is staggering. More importantly, the value of these goods is billions of dollars every day. Therefore, some means of protection and security is needed to minimize losses due to theft of the trailers or boxes that are hauled using tractors. For example, one method of security used in hauling tobacco products by truck is heavily armed guards and deception. The primary and loaded tractor trailer rig is sent in one direction, while a second tractor trailer rig is used as a decoy. However, the dominant method used for security is the kingpin lock. First, a kingpin is described.

The kingpin is a metal pin that is securely affixed to the underside of a trailer (or box) on a centerline proximate to the forward end of the trailer. The tractor, driven by a driver, backs under the trailer aligning a fifth wheel slot with the kingpin. Essentially, the pin is the male part and the fifth wheel slot is the female part. The slot is formed from two spring loaded jaws. Once the fifth wheel slot slips directly around the kingpin, a hand crank on the side of the trailer is used by the driver to raise and lower the landing gear of the trailer for the purpose of moving the trailer and/or parking the trailer.

The deceptively simple kingpin lock secures the trailer from being connected to a semi-tractor for the purpose of moving. These locks are hand-held detachable devices. The trucking industry primarily uses three different kingpin locks. The three kingpin locks differ essentially only in size. One manufactured by Transport Security, Inc. is a very heavy metal device using a movable detent in an arc shape to engage the kingpin in a scissors-like clamping motion around a portion of the kingpin. The other two kingpin locks are much smaller and are the primary kingpin locks used in the industry. More specifically, one is manufactured by Holland. All three operate by use of a key. For the latter two, a manually inserted small key is used to turn a cam connected to a metal tongue within a lock mechanism. The tongue is a metal cylindrically-shaped metal piece located inside a recess in a wall of a cylindrically shaped barrel. Then the cam moves the metal tongue inwardly toward the kingpin. Once the metal tongue contacts the kingpin, the key is removed from the lock mechanism, leaving the tongue in contact with the kingpin. The key is kept by the driver until the kingpin lock needs to be removed. Then the driver reinserts the key into the lock mechanism and the metal tongue is withdrawn using a turning motion of the key, thereby operating the cam, which in turn is connected to the metal tongue. The reason the kingpin lock cannot be removed from the kingpin is 1) because the key is necessary for locking and unlocking the lock, 2) the metal tongue cannot be slipped off the kingpin since the kingpin upper and lower diameters are greater than the center diameter where the metal tongue is in contact, and 3) because the metal cylindrical walls of the kingpin locks are thick enough to make removable by a cutting torch highly impractical and time consuming.

Unfortunately, the kingpin locks have some major disadvantages. Because the slot on the tractor is heavily greased, the kingpin immediately becomes greasy when first engaged. Then the kingpin lock becomes greasy almost immediately upon use. It seems simple enough to wipe off the grease from the kingpin lock in order to use it. However, limited space exists to store enough rags to be constantly wiping off the lock. Therefore, the typical location for the locks is in a cardboard box or on the floor in a small storage compartment located behind the cab of the tractor. The driver now is reluctant to use the pinlock because it is absolutely filthy, has been thrown in a box with other things, and cannot be easily cleaned because all the rags are just as greasy. Herein lies the key problem. Although the kingpin lock is required to be used to prevent theft, the drivers tend to not use it because of the inconvenience in looking for and using the pinlock.

Therefore, it is an object of the present invention to provide a simple method of using a kingpin lock to eliminate the above mentioned disadvantages. Another object is to provide an inexpensive holder, at less cost than the pinlock itself. Still another object of the invention is to provide a method to use multiple embodiments to accommodate all three kingpin locks in the industry. Yet another object of the present invention is to provide a method for use of the embodiments in non-analogous fields, such as the railroad industry. To date, to the knowledge of the Applicant, no such method for such a device has been invented. The Applicant thinks the present invention overcomes a long-standing, and even ignored problem, that has resulted in the loss of billions of dollars due to theft of trailers or boxes in the trucking industry.

SUMMARY OF THE INVENTION

The above-mentioned difficulties and problems are overcome by the present invention. The present invention is an elegantly simple method of using the device. Applicant's Kingpin Lock Holder is a one piece, durable, cylinder-like device that is inserted within the main cylinder part of a kingpin lock. One preferred embodiment is used with the two primary kingpin lock devices previously described. The holder has an outside diameter in close tolerance to the inside diameter of either lock device. In addition, the holder is easily insertable into either lock device. A round hole is located within the wall of the holder such that a recess in the cylinder wall of each lock device aligns with the round hole in the holder. The diameter of the hole in the holder is sufficient to allow the metal tongue to be inserted from the lock device through the hole in the holder. Then the key in the kingpin lock device is removed leaving the kingpin lock secured to the holder. In addition, the kingpin lock holder has a metal plate perpendicularly welded to the cylinder part. The plate has, preferably, a hole that has been drilled through each flange of the plate. Then bolts are used to secure the holder to another metal surface. The holder can also be welded to secure it to another metal surface. The surface could be the underside of a trailer or box near the kingpin. This location permits the kingpin lock to be proximate to the kingpin for convenience in installing the lock. Another location could be in a storage compartment behind the cab of the tractor.

Key novel features or advantages include the ease of use, the light weight of the holder, its flexibility in location on a trailer or tractor, its inexpensive nature to manufacture, and flexibility in design to accommodate other larger kingpin lock devices. In addition, major advantages include preventing the need for holding the greasy kingpin lock and ease of finding the lock. These, and other, novel features and advantages of the present invention are set forth more completely in the accompanying drawings and the following description.

BRIEF DESCRIPTION OF THE DRAWINGS

Details of the invention, and of the preferred embodiment thereof, will be further understood upon reference to the drawings, wherein closely related elements have the same number but different alphabetical suffixes, and further wherein.

DETAILED DESCRIPTION OF THE PREFERRED EMBODIMENTS

Figure 1:
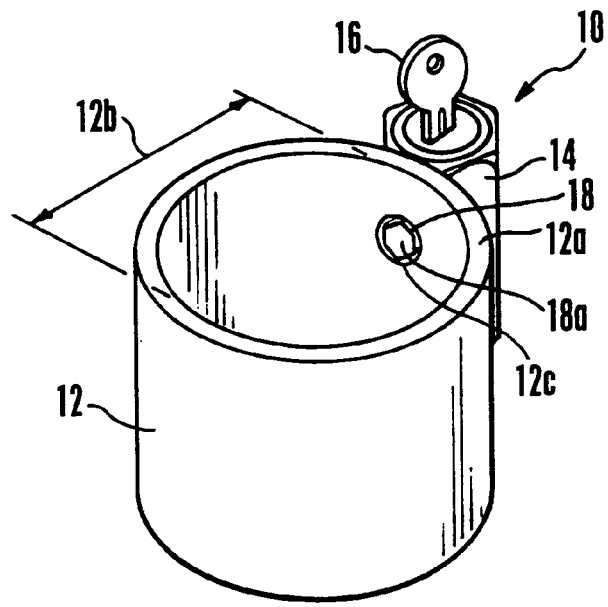
FIG. 1 is a perspective view of a representative kingpin lock device illustrating a lock mechanism, cylinder, and key.

The above-mentioned difficulties and problems of the prior art are overcome by the present invention. Referring first to FIG. 1, a perspective view of a representative kingpin lock device 10 is shown comprising a cylinder 12, a lock mechanism 14, and a key 16. The present invention holds lock device 10. However, a more complete description of the lock device 10 is necessary before describing the present invention.

The cylinder 12 is the primary structural feature of the lock device 10. Welded to the cylinder 12 is the lock mechanism 14. As shown in FIG. 1, the key 16 is inserted into the lock mechanism 14. More specifically, the cylinder 12 further comprises a cylinder wall 12a with a cylinder inside diameter 12b. In addition a cylinder wall recess 12c is shown. Within the wall recess 12c, a metal tongue 18 is seen. The metal tongue 18 is actuated by the key 16 when the lock device 10 is slipped over a kingpin (not shown) on a semi-trailer. The kingpin is the metal structure, permanently secured to a metal surface under a trailer or box, which when needed, is inserted into a jaw device on a tractor fifth wheel. Then the tractor can haul the goods on a flatbed or in a trailer to a destination. Now, continuing the description of the kingpin lock device 10, the metal tongue 18 is inserted into the cylinder 12 until a metal tongue end 18a physically touches the kingpin. At this point, the key 16 is manually removed and the kingpin is secured by the kingpin lock device 10. When a user, typically the driver of a tractor, is ready to hitch a trailer to his tractor, he reverses the above described operation to unsecure the kingpin.

Figure 2:
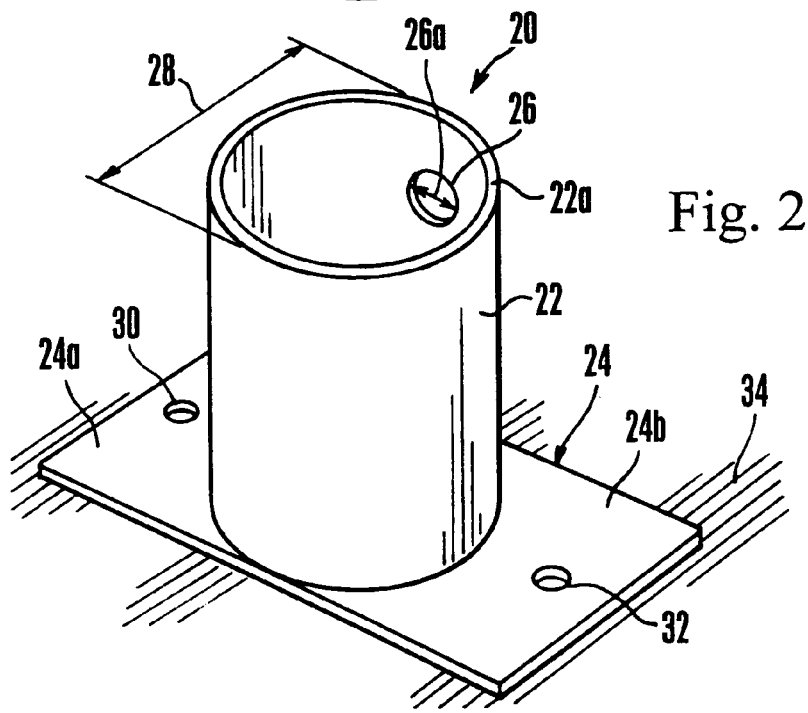
FIG. 2 is a perspective view of a preferred embodiment of the present invention.

Referring now to FIG. 2, a perspective view of a preferred embodiment of the present invention is shown. A kingpin lock holder device 20 comprises a holder cylinder 22, and a metal plate 24. The holder cylinder 22 is welded perpendicularly to the metal plate 24. During operation, the holder device 20 is inserted into a kingpin lock 10 and removably affixed. Typically, and preferably, holder 20 is subsequently removably affixed to a planar surface, thereby allowing for ease of storing, finding, and using the kingpin lock 10 in concert with a kingpin.

More specifically, the holder cylinder 22 further comprises a holder cylinder wall 22a and a round cylinder wall hole 26. The holder 20 has an outside diameter 28 in close tolerance to the inside diameter 12b of lock device 10. For instance, in one type of kingpin lock 10, the inside diameter 12b (in FIG. 1) is between 2.850 inches and 2.920 inches. The tolerance of the holder 20 would be approximately 1/16 inch, so the outside diameter 28 of the holder 20 would be approximately 2.79 to 2.86 inches. In addition, the holder 20 is easily insertable into either lock device 10. The outside diameter 26a of the hole 26 in the holder 20 is sufficient to allow the metal tongue 18 to be inserted from the lock device 10 through the hole 26 in the holder 20. Then the key 16 in the kingpin lock 10 is removed leaving the lockpin secured to the holder 20.

The metal plate 24 further comprises a first flange 24a, and a second flange 24b. The metal plate 24 further comprises a first bolt hole 30 in the first flange 24a and a second bolt hole 32 in the second flange 24b. The plate 24 has, preferably, holes 30, 32 that have been drilled through each flange 24a, 24b respectively of the plate 24. Preferably, the holder 20, including the metal plate 24, is mild steel. For a smooth appearance, the steel is coated. Then, the metal plate 24 further preferably uses approximately a 1/4 inch bolt in the first bolt hole 30 in the first flange 24a and a 1/4 inch bolt in the second bolt hole 32 in the second flange 24b to secure the holder 20 to another metal surface. The surface could be the underside of a semi-trailer or box near the kingpin, typically near the landing gear of the trailer. This location permits the kingpin lock 10 to be proximate to the kingpin for convenience in installing the lock 10. Another location could be in a storage compartment behind the cab of the tractor.

Figure 3:
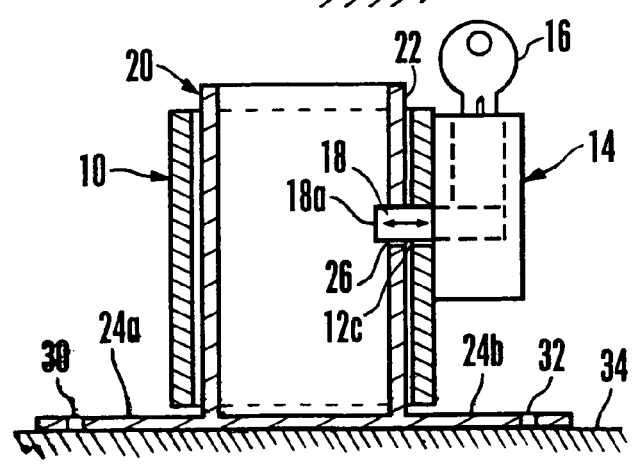
FIG. 3 is a side view of the holder of the present invention inserted within a kingpin lock.

Referring lastly to FIG. 3, a side view of the holder 20 inserted within a kingpin lock 10 is shown, illustrating a preferred embodiment of the present invention. More specifically, a typical kingpin lock 10 is shown secured to the holder 20 for mounting on a planar surface 34. The planar surface 34, as described previously, may be the underside of a trailer or box, or alternatively, a storage compartment in the tractor cab.

Continuing with FIG. 3, a method of operation is described. Ten steps are now described. The goal of the first part of the method, steps 1) through 5), is to removably affix the pin lock 10 to the holder 20, whereby the kingpin lock device 10 is now in a stored position until needed for locking a kingpin.

A method of operation of a kingpin lock holder 20 comprises the steps of:

1) inserting the holder 20 into a kingpin lock device 10,
2) aligning the round hole 26 located within the holder cylinder wall 22a of the holder 20 with the recess 12c in the cylinder wall 12a of the lock device 10,
3) turning the key 16 in the lock mechanism 14 of the lock device 10, wherein the turning causes the metal tongue 18 to move inwardly toward the holder 20,
4) inserting the metal tongue 18 from the lock device 10 through the cylinder wall hole 26 in the holder 20, and
5) removing the key 16 from the lock mechanism 14, wherein the pin lock 10 is removably affixed to the holder 20, whereby the kingpin lock device 10 is now in a stored position until needed for locking a kingpin.

The goal of the second part of the method, steps 6) through 10), is to remove the kingpin lock device 10 from the holder 20, whereby the kingpin lock device 10 may be secured to a kingpin, thereby preventing theft of a truck trailer. The method of operation of a kingpin lock holder 20 further comprises the steps of:

6) inserting the key 16 into the lock mechanism 14,
7) turning the key 16, wherein the turning causes the metal tongue 18 to move outwardly from the holder 20,
8) withdrawing the metal tongue 18 from the lock device 10 through the hole 26 in the holder 20,
9) removing the key 16 in a lock mechanism 14 of the lock device 10, and
10) removing the kingpin lock device from the holder 20, whereby the kingpin lock device 10 may be secured to a kingpin, thereby preventing theft of a truck trailer.

Key novel features or advantages include the ease of use, light weight of the holder 20, its flexibility in location on a trailer or tractor, its inexpensive nature to manufacture, and flexibility in design to accommodate other larger kingpin lock devices. In addition, major advantages include preventing the need for holding the greasy kingpin lock 10 and ease of finding the lock 10 when needed in a hurry.

The present invention has numerous applications. The holder 20 may be used in the railroad industry, as well as the trucking industry. In the railroad industry, the container chassis could have a holder 20 on every kingpin lock used. For the trucking industry, the manufacturer of the holder 20 can easily modify the holder 20 dimensions to accommodate the different dimensions of the three kingpin locks used.

Another advantage of the present invention is the inexpensive design. Because the kingpin locks are produced in enormous numbers, perhaps for almost every trailer or box in the United States, use of the holder 20 would require extremely high volumes to be manufactured. Therefore, the unit price would be extremely inexpensive for any end user. Even given the different embodiments, the volumes would provide for an extremely inexpensive holder 20 compared to the current list prices for the two major kingpin locks. In fact, the estimated price for the holder 20 is almost an order of magnitude below the price of the major kingpin locks.

Still another advantage of the present invention is the design flexibility. The dimensions of the holder 20 may be changed to meet the needs of the end user and the specific application. The diameter of the cylinder may vary. The length of the holder 20 may also vary. Therefore, the design dimensions are flexible. Other advantages of the present invention include fabricating the holder 20 from fiberglass, aluminum alloy, steel, or plastic. The materials need to be formable into a cylindrical shape and able to be secured to a metal surface. These materials provide other embodiments and applications for a variety of uses.

Consequently, while the foregoing description has described the principle and operation of the present invention in accordance with the provisions of the patent statutes, it should be understood that the invention may be practiced otherwise as illustrated and described above and that various changes in the size, shape, and materials, as well as on the details of the illustrated construction may be made, within the scope of the appended claims without departing from the spirit and scope of the invention.

What is claimed is:

1. A method of operation of a kingpin lock holder, wherein said method comprises the steps of:
    inserting said holder into a kingpin lock device,
    aligning a round hole located within a wall of said holder with a recess in a cylinder wall of said lock device,
    turning a key in a lock mechanism of said lock device, wherein said turning causes a metal tongue to move inwardly toward said holder,
    inserting said metal tongue from said lock device through the hole in said holder, and
    removing said key from said lock mechanism, wherein said kinpin lock device is removably affixed to said holder, whereby said kingpin lock device is now in a stored position until needed for locking a kingpin.

2. A method of operation of a kingpin lock holder, according to claim 1, wherein said method further comprises the steps of:
    inserting said key into said lock mechanism,
    turning said key, wherein said turning causes said metal tongue to move outwardly from said holder,
    withdrawing said metal tongue from said hole in said holder,
    removing said key from said lock mechanism of said lock device, and
    removing said kingpin lock device from said holder, whereby said kingpin lock device may be secured to a kingpin, thereby preventing theft of a semi-trailer.

* * * * *